(12) United States Patent
Lang et al.

(10) Patent No.: US 9,376,964 B2
(45) Date of Patent: Jun. 28, 2016

(54) CONTROL SYSTEM

(71) Applicant: ALSTOM Technology Ltd, Baden (CH)

(72) Inventors: Wolfgang Lang, Lauchringen (DE);
Hanspeter Zinn, Baden-Ruetihof (CH);
Heinz Bollhalder, Doettingen (CH);
Xabier Antonanzas, Baden (CH)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 628 days.

(21) Appl. No.: 13/769,966

(22) Filed: Feb. 19, 2013

(65) Prior Publication Data
US 2013/0212999 A1    Aug. 22, 2013

(30) Foreign Application Priority Data

Feb. 20, 2012  (CH) .......................................... 215/12

(51) Int. Cl.
*G01C 25/00*     (2006.01)
*F02C 9/00*      (2006.01)
*F01D 17/02*     (2006.01)
*F01D 21/00*     (2006.01)
*F23N 5/24*      (2006.01)
(Continued)

(52) U.S. Cl.
CPC . *F02C 9/00* (2013.01); *F01D 17/02* (2013.01); *F01D 21/003* (2013.01); *F23N 5/24* (2013.01); *G05B 19/0428* (2013.01); *F05D 2260/80* (2013.01); *F05D 2260/84* (2013.01); *F05D 2260/96* (2013.01); *F05D 2270/083* (2013.01);
(Continued)

(58) Field of Classification Search
CPC .... G06F 17/5022; G02C 9/00; F23N 2027/16
See application file for complete search history.

(56) References Cited

U.S. PATENT DOCUMENTS 5,757,672 A     5/1998  Hoepken
2003/0061008 A1  3/2003  Smith et al.
(Continued)

FOREIGN PATENT DOCUMENTS

EP      0677830 A1    10/1995
EP      2149832 A2    2/2010
(Continued)

OTHER PUBLICATIONS

Office Action (Notification of Reasons for Refusal) issued on Dec. 8, 2014, by the Japan Patent Office in corresponding Japanese Patent Application No. 2013-029629, and an English Translation of the Office Action. (6 pages).

(Continued)

*Primary Examiner* — Phuong Huynh
(74) *Attorney, Agent, or Firm* — Buchanan Ingersoll & Rooney PC

(57) ABSTRACT

A control system for at least one of steam turbines, gas turbines or power plants includes a sensor system configured to monitor predefined operating parameters, the sensor system including redundant sensors. A central processor arrangement of the control system has an input side configured to receive measurement data from the sensor system and an output side configured to communicate with operation control elements of the turbines or power plants. A sensor side processor circuit is assigned at least to the redundant sensors, the processor circuit being configured to continuously check the sensors for error-free operation, to protect or block the input side of the central processor arrangement from erroneous signals, and to only respectively forward or further process signals from a sensor that has been identified as error-free in one channel.

1 Claim, 2 Drawing Sheets

(51) Int. Cl.
    *G05B 19/042*     (2006.01)
    *G06F 11/30*     (2006.01)

(52) U.S. Cl.
    CPC ......... *F23N 2027/16* (2013.01); *Y02B 70/3241* (2013.01); *Y04S 20/227* (2013.01)

(56) References Cited

U.S. PATENT DOCUMENTS

| | | | |
|---|---|---|---|
| 2007/0043533 A1* | 2/2007 | Wiles | G01M 13/025 702/183 |
| 2007/0214797 A1 | 9/2007 | Bland et al. | |

FOREIGN PATENT DOCUMENTS

| | | |
|---|---|---|
| JP | 11-082908 A | 3/1999 |
| JP | 2001-290519 A | 10/2001 |
| RU | 2313099 C2 | 12/2007 |
| WO | WO 2004005938 A1 | 1/2004 |
| WO | WO 2007021425 A1 | 2/2007 |

OTHER PUBLICATIONS

Office Action (Notice of Preliminary Rejection) issued on Jan. 30, 2015, by the Korean Patent Office in corresponding Korean Patent Application No. 10-2013-0018272, and an English Translation of the Office Action. (8 pages).

European Patent Office, Search Report in Swiss Patent Application No. 215/2012 (Jun. 15, 2012).

Russian Office Action dated May 19, 2014, issued by the Russian Patent Office in corresponding Russian Patent Application No. 2013107360/06(010944), and English language translation of Office Action. (10 pages).

* cited by examiner

CONTROL SYSTEM

CROSS REFERENCE TO RELATED APPLICATIONS

This application claims priority to Swiss Patent Application No. CH 00215/12, filed Feb. 20, 2012, which is hereby incorporated by reference herein in its entirety.

FIELD

The invention relates to control systems for steam and gas turbines and/or power plants or the like, having a sensor system which is intended to monitor predefined operating parameters and the measurement data from which can be supplied to an input side of a central processor arrangement of the control system, which in turn communicates, on the output side, with operation control elements of the turbines or power plant or the like, the sensor system having redundant sensors.

The invention also relates to sensor arrangements for such control systems.

BACKGROUND

Various parameters are monitored in gas and steam turbine installations in order to enable optimum operation. In this context, reference can be made, for example, to sensor system arrangements which are used to detect noise in combustion chambers of gas turbines or vibrations in or on turbine parts in order to control operating parameters such that a low-vibration or optimum operating sequence is ensured.

In this case, there is regularly the need to monitor the sensor system for error-free operation and/or to use the sensor signals to derive correlated variables which are needed for the operation of the control system.

Therefore, the central processor arrangement must carry out extensive preliminary work before generating output commands for operation control elements or elements for controlling the supply of fuel or air to a combustion process. This is synonymous with various processor functions having to be adapted to the sensor system used in each case.

This results in the problem of a subsequent design modification of the sensor system not being readily possible, for example because the design modification results in a modified signal format of the sensor system and this modified signal format cannot be readily processed.

WO 2004/005938 A1 discloses an apparatus for determining the rotational speed of a rotating machine part with redundant sensors and evaluation circuits. The apparatus disclosed there is constructed from two partial apparatuses which are arranged in a parallel manner and are each in the form of separate channels. One of the partial apparatuses suffices to perform the task of monitoring the rotational speed. A sensor signal is evaluated by two evaluation circuits in each case. "Two out of three" redundancy is provided with respect to the rotational speed signals in each partial apparatus, that is to say one of the at least three rotational speed signals applied to the signal inputs of each partial apparatus may be erroneous without the monitoring function of each partial apparatus being jeopardized thereby. Although a high degree of availability and reliability of the installation is achieved with this technical solution, an increased outlay on apparatus must be disadvantageously accepted.

SUMMARY

In an embodiment, the present invention provides a control system for at least one of steam turbines, gas turbines or power plants that includes a sensor system configured to monitor predefined operating parameters, the sensor system including redundant sensors. A central processor arrangement of the control system has an input side configured to receive measurement data from the sensor system and an output side configured to communicate with operation control elements of the turbines or power plants. A sensor side processor circuit is assigned at least to the redundant sensors, the processor circuit being configured to continuously check the sensors for error-free operation, to protect or block the input side of the central processor arrangement from erroneous signals, and to only respectively forward or further process signals from a sensor that has been identified as error-free in one channel.

BRIEF DESCRIPTION OF THE DRAWINGS

The present invention will be described in greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
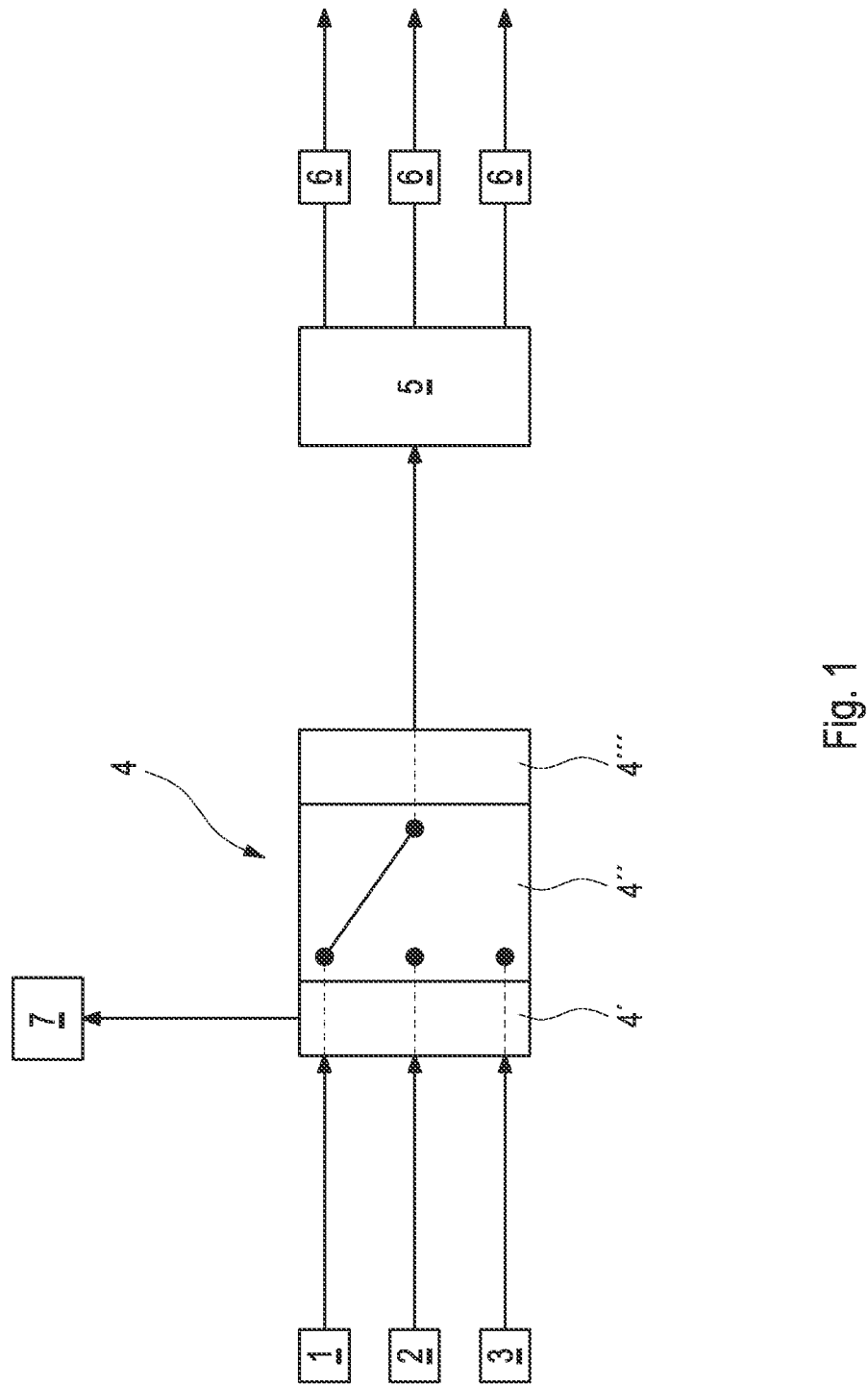
FIG. 1 schematically shows a schematic diagram of a sensor group with an assigned processor circuit, and FIG. 2 schematically shows exemplary processing of sensor signals by the sensor-side processor circuit.

An aspect of the present invention is to provide a control system in which a high degree of flexibility in terms of the sensor system and thus a higher degree of reliability and availability of the installation can be ensured with relatively little outlay.

In an embodiment of the invention, this can be achieved by virtue of the fact that at least some redundant sensors of the sensor system are assigned a sensor-side processor circuit which continuously checks the associated sensor(s) for error-free operation and protects or blocks the input side of the central processor arrangement from erroneous signals from the sensor(s), and the sensor-side processor circuit only respectively forwards or further processes the signals from a sensor which has been identified as error-free in one channel.

The invention accordingly comprises sensor arrangements which are characterized by sensors with an assigned processor circuit which continuously monitors or checks the sensors for error-free operation and, on the output side, transmits only signals having a predefinable correlation to signals from a sensor which has been identified as error-free.

The invention is based on the general concept of checking sensors for error-free operation and conditioning sensor signals for a central process controller outside the central process controller, with the result that the latter must only undertake "core functions" for controlling the operating sequence of the respective installation.

As a result, the work of the central processor arrangement can thus be restricted to pure computer functions for determining optimum manipulated variables for the operating elements. In contrast, the production and formatting of the input variables needed for the respective computer process are "outsourced".

According to a preferred embodiment of the invention, provision is made, in a fundamentally known manner, to provide a sensor system having a plurality of sensor groups each consisting of redundant sensors in order to be able to ensure an optimum operating sequence even in the case of faults of an individual sensor.

In the case of such an embodiment of the installation, the invention preferably provides for a separate processor circuit to be assigned to the redundant sensors forming a sensor group, which processor circuit monitors each sensor for error-free operation and, if a sensor in the group is defective, further processes only the signals from an error-free sensor in this group to form an input signal for the central processor arrangement.

At the same time, the processor circuit assigned to the sensor group may control a display, with the result that an error signal is initiated there and the defective sensor can be replaced at the next opportunity.

Since the sensor-side processor circuit assigned to the sensor group in any case further processes only the signals from an error-free sensor and passes said signals to the central processor arrangement, it is possible, in principle, to replace a defective sensor during operation of the respective installation, provided that the sensors are arranged in a manner suitable for replacing sensors during operation. In any case, the work of the control system is not impaired on account of the sensor system being networked to the central processor arrangement according to the invention via sensor-side processor circuits.

Further important features and advantages of the invention emerge from the subclaims, from the drawings and from the associated description of the figures using the drawings.

It goes without saying that the features mentioned above and the features yet to be explained below can be used not only in the respectively stated combination but also in other combinations or alone without departing from the scope of the present invention.

Preferred exemplary embodiments of the invention are illustrated in the drawings and are explained in more detail in the following description, identical reference symbols referring to identical or similar or functionally identical components.

According to FIG. 1, a power plant may have redundant sensors 1 to 3 which can be used to detect a predefined parameter. For example, the sensors 1 to 3 might detect noise of a combustion chamber installation of a gas turbine installation or noise of a steam turbine installation or the like. According to the invention, the redundant sensors 1 to 3 are assigned a sensor-side processor circuit 4, the operation of which is explained further below. This processor circuit 4 forwards the sensor signals, after predefinable conditioning, to a central processor arrangement 5 of a control system of the power plant. The central processor arrangement 5 then generates, in a fundamentally known manner, signals for drivers 6 which in turn control operation control elements, for example for supplying fuel.

This sensor-side processor circuit 4 has at least one input-side processor unit 4' which receives the signals from the sensors 1 to 3 and checks said signals for the absence of errors. This check can be carried out, for example, by evaluating the noise spectrum of the sensors. In principle, however, any desired type of error checking is possible. If the signals from all sensors 1 to 3 are error-free, one of the sensors 1 to 3 is selected to forward the respective sensor signals according to a basically arbitrary stipulation in a further processor unit 4" which functionally operates in the manner of a switch.

If the processor unit determines that one of the sensors 1 to 3 is operating in a defective manner, the processor unit 4" selects one of the sensors operating in an error-free manner to forward the respective sensor signals. In any case, the sensor operating in a defective manner is excluded from forwarding its signals.

The sensor signals respectively forwarded by the processor unit 4" can still be "conditioned" in a downstream processor unit 4'''. This is expedient, for example, when the central processor arrangement 5 is not suitable for directly processing the respective sensor signals because it can process only signals derived from the sensor signals by means of transformation, for example.

This is explained below using FIG. 2. Without restricting generality, the sensors 1 to 3 may detect noise. In the case of error-free operation, each sensor 1 to 3 then generates an output signal A on the basis of the time t according to image A in FIG. 2. In this case, A may represent the amplitude of the movement of a diaphragm which vibrates analogously to the sound vibrations of the noise to be detected.

It is now assumed, by way of example, that the central processor arrangement 5 is not intended to directly process the output signals A at all. Rather, the central processor arrangement 5 may be designed to process the spectrum of the sound vibrations in order to determine its output signals. This spectrum is illustrated, by way of example, in image B in FIG. 2, the intensity I of the sound vibrations being depicted on the basis of the frequency f.

Figure 2:
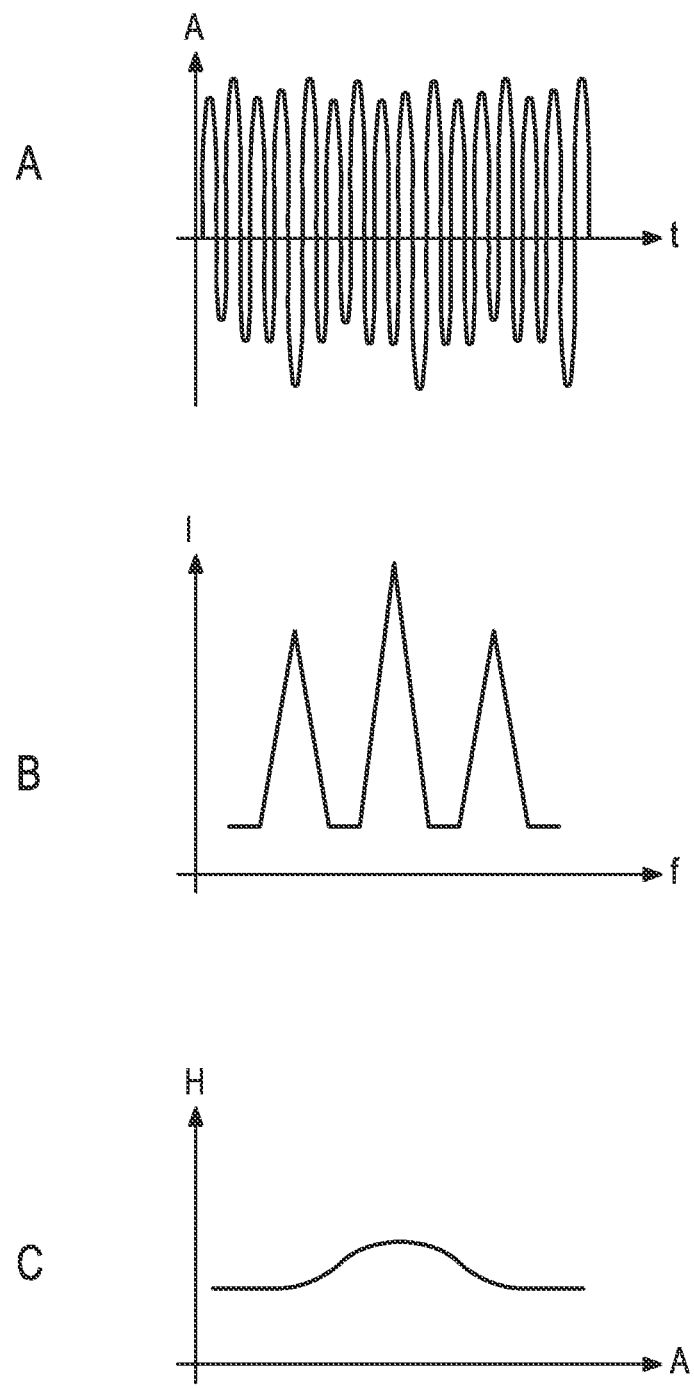

If the central processor arrangement 5 now requires signals according to image B in FIG. 2, the processor unit 4''' of the sensor-side processor circuit 4 can carry out a spectral analysis and, in this manner, can transform the signals according to image A into signals according to image B in FIG. 2. In the present example, the processor unit 4''' is thus used to transform the signals from a sensor 1 to 3 operating in an error-free manner into signals suitable for the work of the central processor arrangement. The processor unit 4''' therefore has an interface function such that signals which are intended for the central processor arrangement 5 and can be processed by the processor arrangement only in transformed form are accordingly transformed.

In this manner, the central processor arrangement can be "relieved" or designed exclusively for carrying out "core activities". This simultaneously provides the advantage that, in the case of a design change of the sensors and an associated change in the structure of the sensor signals, it is only necessary to ensure an accordingly adapted sensor-side processor circuit 4; in contrast, the central processor arrangement 5 may remain completely unchanged. This is simultaneously associated with the advantage that the central processor arrangement 5 can have a comparatively simple design because the type of operations to be carried out remains unchanged even if the sensor system is changed. Another possibility for signal transformation is explained using images A and C in FIG. 2:

In this example, the sensors 1 to 3 may detect vibrations, the output signal A then being able to represent the amplitude of the detected vibrations. It is now assumed that only the frequency distribution of the different amplitudes is essential for the work of the central processor arrangement 5. In such a case, the processor unit 4''' can transform the sensor signals illustrated in image A into a representation according to image C which represents the frequency distribution H of the different amplitudes A.

In summary, the invention can be characterized to the effect that a group of redundant sensors 1 to 3 is assigned a sensor-side processor circuit 4 which, on the one hand, checks the sensors for error-free operation and respectively selects one of the redundant sensors operating in an error-free manner to forward its sensor signals. In this solution according to the invention, there is thus always one sensor which provides the signals for the central processor arrangement 5. The redundancy of the sensors is thus increased in order to achieve a higher degree of reliability and availability in a single-channel protection system.

On the other hand, the sensor-side processor circuit 4 is used to transform the sensor signals to be forwarded in a manner optimum for the work of the central processor arrangement 5, with the result that the central processor arrangement only needs to perform "core functions". The sensor-side processor circuit 4 therefore undertakes preliminary work for the central processor arrangement, with the result that the latter is considerably relieved and ultimately can have a higher degree of reliability.

Since the sensor-side processor circuit 4 suppresses all signals from sensors operating in a defective manner, the possibility of replacing sensors during installation operation is enabled at the same time. In this context, provision is advantageously made for the sensor-side processor circuit 4 to control a display 7 for indicating the sensor to be replaced. Inspection work to be carried out can also be displayed, if necessary, on this display 7. In principle, the display 7 can also be previously controlled by the central processor arrangement 5 if the respective sensor-side processor circuit 4 forwards corresponding information to the central processor arrangement 5, but control of the display 7 by the sensor-side processor circuit 4 is advantageous because the circuit 4 must detect the defective sensors anyway.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B." Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise.

LIST OF REFERENCE SYMBOLS

1 Sensor
2 Sensor
3 Sensor
4 Sensor-side processor circuit
5 Central processor arrangement
6 Driver
7 Display
A Amplitude
f Frequency
H Frequency
I Intensity

The invention claimed is:

1. A control system for at least one of steam turbines, gas turbines or power plants, the control system comprising:
a sensor system configured to monitor predefined operating parameters and including redundant sensors;
a central processor arrangement having an input side configured to receive measurement data from the sensor system and an output side configured to communicate with operation control elements of the turbines or power plants;
a sensor side processor circuit assigned at least to the redundant sensors, the processor circuit being configured to continuously check the sensors for error-free operation, to protect or block the input side of the central processor arrangement from erroneous signals, and to only respectively forward or further process signals from a sensor that has been identified as error-free in one channel;
wherein the sensor-side processor circuit is configured to transform the signals from a sensor operating in an error-free manner according to a predefined requirement profile of the central processor arrangement; and
wherein the sensor-side processor circuit is configured to control a display for reporting defective sensors.

* * * * *